March 17, 1953     H. W. ADDISON, JR     2,631,745
SCOOP MOUNTING AND DUMPING MECHANISM
Filed Aug. 10, 1951     2 SHEETS—SHEET 1
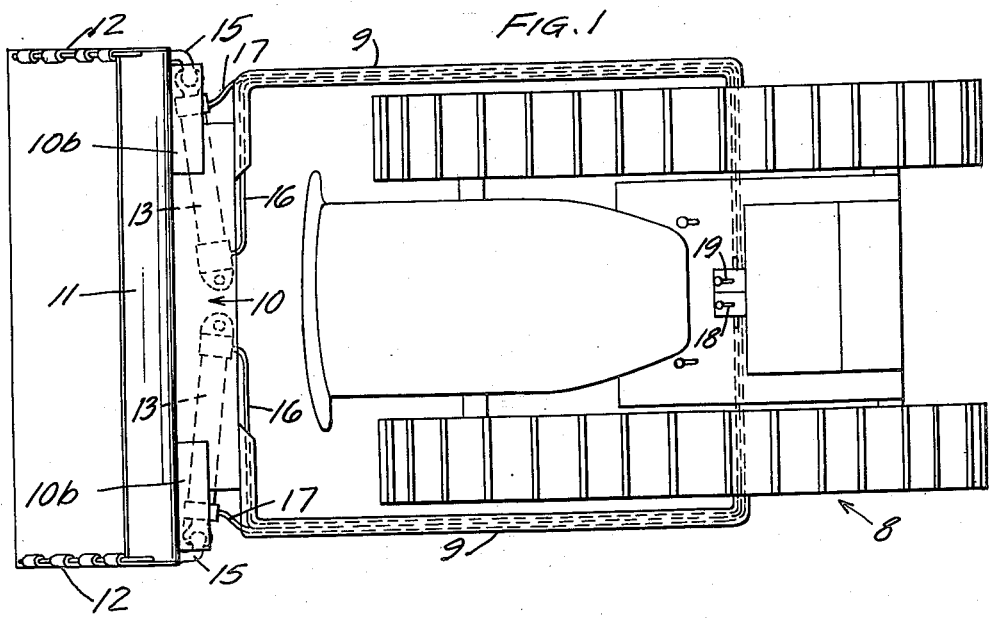
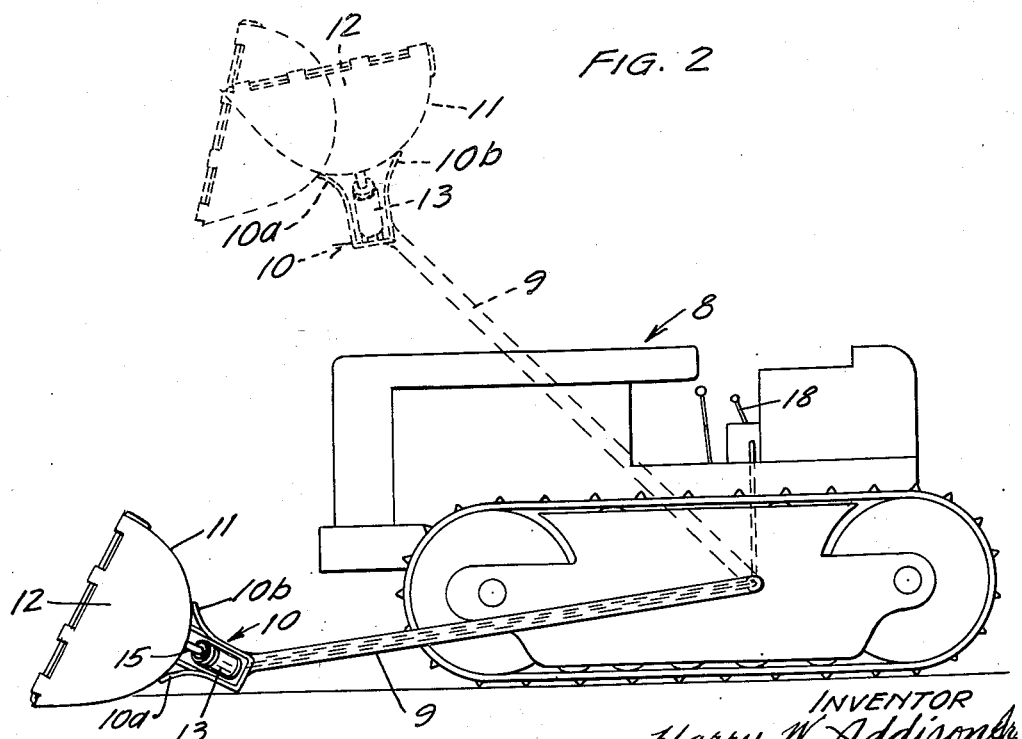

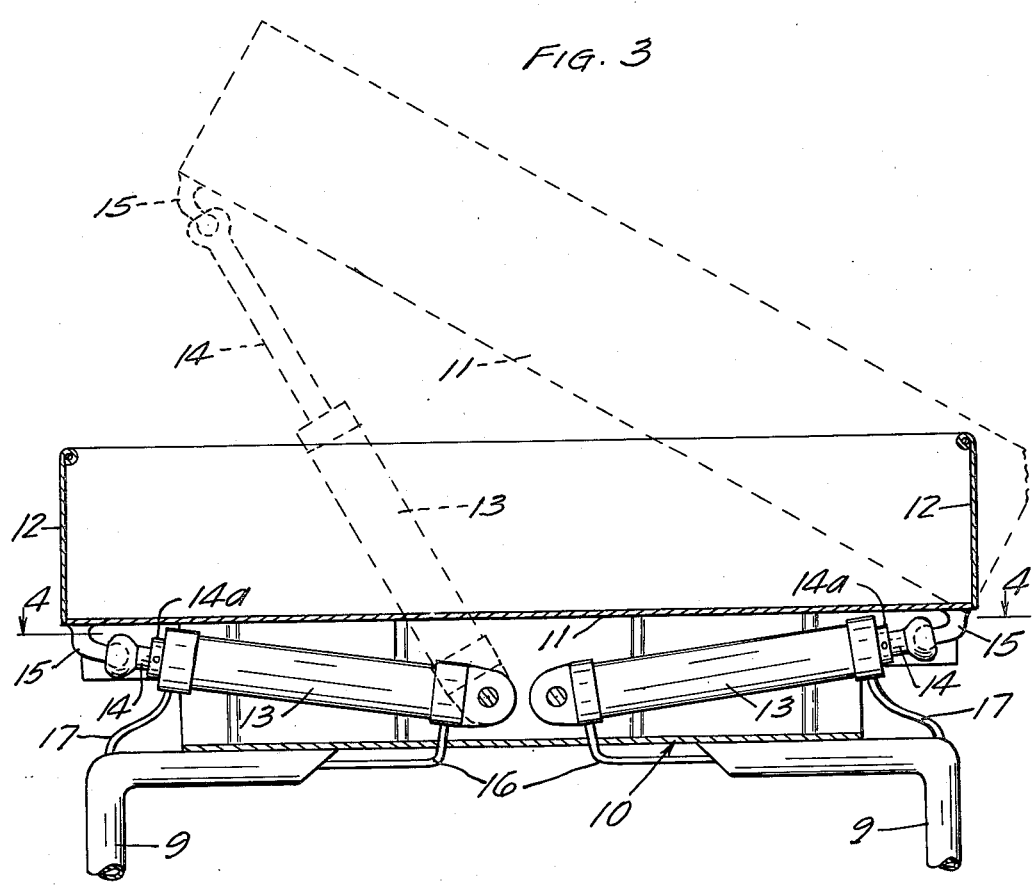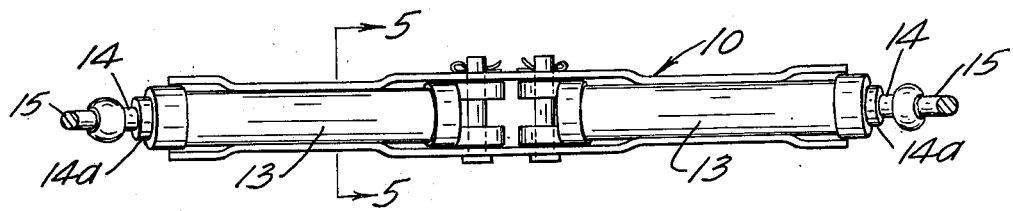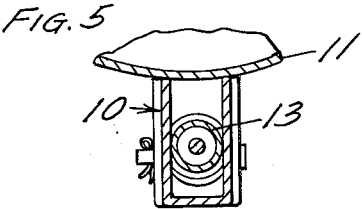

Patented Mar. 17, 1953

2,631,745

UNITED STATES PATENT OFFICE 2,631,745

SCOOP MOUNTING AND DUMPING MECHANISM

Harry W. Addison, Jr., Marshall, Minn.

Application August 10, 1951, Serial No. 241,288

4 Claims. (Cl. 214—140)

This invention relates to mechanism for mounting and dumping front end loader scoops.

It is an object of my invention to provide a mounting and dumping mechanism for the scoops of front end loaders to permit the scoop of a loader to be selectively dumped forwardly or to either side.

It is a convenience when handling material with a front end loader mounted on a farm tractor to be able to dump directly forwardly of the tractor or to dump selectively to either side thereof, thus eliminating much of the maneuvering of the tractor and greatly facilitating positioning of the tractor for dumping the material from the scoop.

It is another object of my invention to provide a front end loader scoop adapted to be transversely mounted across the front end of an automotive vehicle and having a pair of end elevating mechanisms at the respective ends of said scoop to selectively elevate said ends and dump the material to the selected side of the tractor.

It is still another object to provide a scoop for front end loaders for farm tractors and the like having means at both ends thereof for selectively elevating the same to dump the material from said scoop from either end thereof or, when said elevating means are simultaneously actuated, for dumping said scoop directly forwardly of the tractor.

It is a further object to provide dumping means for a front end loader scoop having a pair of hydraulic mechanisms respectively mounted at the ends of said scoop for selectively elevating said ends, the hydraulic mechanisms being adapted to hold one end against horizontal shifting movement to form a substantially fixed pivotal axis about which said scoop is swung when the other end of the scoop is elevated.

It is still a further object to provide a mounting and dumping mechanism for a front end loader scoop having a supporting cradle with two spaced substantially parallel scoop engaging and supporting elements, and having a pair of end elevating mechanisms respectively mounted under the ends of said scoop with the points of connection of said mechanisms with the respective ends of the scoop being disposed in rearwardly spaced relation from the forward scoop supporting element and disposed rearwardly of the center of gravity of the loaded scoop to permit simultaneous actuation of said end elevating mechanisms to raise the rear portion of said scoop and swing the same about the front scoop supporting element as a fulcrum to dump said scoop directly forwardly.

More specifically, it is an object to provide a scoop mounting and dumping mechanism for front end loaders having a scoop engaging and supporting cradle with a loader scoop mounted therein and a pair of double acting hydraulic rams mounted on said cradle substantially in end to end alignment and respectively connected at the end portions of the scoop, said double acting rams permitting selective elevation of the two ends of the scoop while the end not being elevated is held by the other ram against horizontal shifting movement to form a pivotal axis about which the scoop is swung and said arrangement permitting simultaneous actuation of both rams into extended position to dump said scoop directly forwardly, actuation of said rams back into retracted position returning said scoop to normal position in its cradle and holding the same therein.

These and other objects and advantages of my invention will more fully appear from the following description made in connection with the accompanying drawings wherein like reference characters refer to the same or similar parts throughout the several views and in which;

Fig. 1 is a top plan view of a conventional type track laying tractor having a front end loader mounted thereon and showing my scoop mounting and dumping mechanism;

Fig. 2 is a side elevational view thereof showing the loader scoop in lowered pickup position by full lines and in elevated material retaining position by one dotted line view and in forwardly dumping position by another dotted line view;

Fig. 3 is a fragmentary rear elevational view of the dumping mechanism for a front end loader scoop, the scoop and cradle being shown in transverse vertical section and showing one end of the scoop in raised position by dotted lines;

Fig. 4 is a fragmentary horizontal sectional view taken substantially along the line 4—4 of Fig. 3; and Fig. 5 is a vertical sectional view taken substantially along the line 5—5 of Fig. 4.

As illustrated in the accompanying drawings, I provide a scoop for front end loaders adapted to be attached to the front end of a tractor such as the track laying tractor designated as an entirety by the numeral 8 and having the forwardly extending elevating arms or booms 9 pivotally connected at their rear portions to an intermediate portion of said tractor and adapted to be controllably raised and lowered by any suitable conventional means (not shown). A scoop engaging and supporting structure such as the cradle 10 is mounted in fixed relation across the forward ends of the arms 9. The cradle 10 has a front scoop engaging fulcrum structure 10a disposed transversely across the front of the tractor and a rear scoop engaging and receiving member 10b disposed in rearwardly spaced relation to said fulcrum 10a. A scoop 11 has a continuously curved concave inner surface with the lower edge thereof in the form shown extending a substantial distance forwardly of the upper edge thereof and having a forward open mouth portion for collecting material therein. The two ends of the scoop are disposed adjacent the sides of the tractor 8 and are respectively normally closed by the hinged panels 12 which may be releasably held in closed position by any conventional latch means (not shown). In normal pickup position, the scoop 11 is received in the cradle 10 and is engaged by both the front fulcrum 10a and the rear scoop engaging member 10b which serve as a pusher frame behind the lower portion of the scoop mold board.

A pair of hydraulic cylinders 13 have their inner ends pivotally mounted on the scoop supporting structure for swinging movement on a pair of parallel closely spaced longitudinal axes disposed in close association to the longitudinal center line of the tractor 8. Each of the cylinders 13 has a double acting projectable and retractable ram mounted therein for forcible projection and retraction of the respective rods 14. The rods 14 are pivotally connected with the outer end portions of the respective ends of scoop 11 as by the connector elements 15 respectively forming a pair of ball and socket joints with the outer ends of the projectable rods 14. These connector elements 15, as best shown in Fig. 2, are disposed rearwardly of the center of gravity of the scoop 11 when said scoop is loaded and the forward supporting fulcrum 10a of the scoop cradle 10 is disposed in forwardly spaced relation from said connector elements 15 and said elements 15 are of course fixed to the lower end portions of said scoop. Two hydraulic flow lines are respectively connected to the end portions of each cylinder 13 and are designated respectively by the numerals 16 and 17. The flow lines 16 are respectively mounted at the inner ends of cylinders 13 and the lines 17 are respectively connected at the outer ends thereof. It should be noted that when the scoop is in lowered position the two cylinders 13 slope upwardly from their inner ends to their outer ends, as best shown in Figs. 2 and 3, and also slope forwardly from their inner ends to their outer ends, as best shown in Figs. 1 and 2. By thus positioning said cylinders, the two rams will serve to both dump the scoop 11 forwardly when simultaneously actuated and dump said scoop to either side depending upon which ram is projected outwardly.

Any suitable source of hydraulic fluid under pressure (not shown) may be provided and suitable manually operated valves respectively controlled by the two handles 18 and 19 control the flow of fluid under pressure to the respective cylinders 13. When the loaded scoop has been raised by booms 9 to the dotted line position shown in Fig. 2 and it is desired to dump the material therein directly forwardly, both hydraulic rams are simultaneously projected outwardly to tip the scoop into the forwardly dumping position as shown by the other dotted lines of Fig. 2. By providing the upwardly sloping cylinders 13 the outwardly directed projection of the rams contained therein will produce an upwardly directed vertical component of force on the two connector elements 15 which of course must be strong enough to resist the horizontal component produced thereon by the cylinders. By positioning these connector elements 15 rearwardly of the center of gravity of the loaded scoop, the scoop will be tilted about the fulcrum structure 10a of the cradle 10 and dump the material forwardly. In the form shown, separate and independent control valves are provided for the cylinders 13 and the operating handles for said valves will actuate the respective cylinders through lines 16 when shifted in one direction and through lines 17 when shifted in the other direction. Thus, when the scoop is to be dumped directly forwardly, both handles 18 and 19 will be shifted in the same direction to supply lines 16 to the respective cylinders 13 and, when the scoop is to be dumped to either side, one handle will be shifted in one direction and the other handle in the other direction depending upon the side to which the material is to be dumped. As best shown in Fig. 2, the lower portion of the cradle structure has a pair of parallel upstanding side walls adapted to closely embrace the side portions of cylinders 13 and to prevent shifting movement of said cylinders longitudinally of the tractor, thus preventing any bending stress on the inner pivot pins of said cylinders 13.

The scoop 11 may also be dumped laterally to either side of the tractor 8 by elevating only one end thereof. This of course is accomplished by projecting only one of the rods 14 outwardly. Suitable stop means may be provided on the rods 14 such as the collars 14a adapted to engage the outer ends of the respective cylinders 13 and positively position said rods when the same are in retracted position. If necessary, of course, when one of the scoop ends is to be elevated, the cylinder at the other end of the scoop may be supplied with fluid through line 17 to hold the ram in retracted position to prevent horizontal shifting movement of the scoop when one end thereof is elevated. The cradle 10 must have the fulcrum 10a and the rear scoop engaging member 10b sufficiently spaced apart to prevent overturning forwardly of the scoop when one end thereof is elevated, as shown in Fig. 3.

By providing double acting rams within cylinders 13 it is possible to forcibly return said scoop from dumping position into material pick-up position and the collars 14a positively position said scoop transversely of the tractor.

It will be seen that I have provided a relatively simple mechanism for mounting and dumping scoops for front end loaders and the like by which the scoop may be selectively dumped directly forwardly or dumped to either side at the will of the operator. Whether the scoop is being dumped forwardly or to one side or the other, the two rams within the cylinders 13 cooperate to hold the scoop structure 11 against shifting movement transversely of the tractor and resolve the forces produced by hydraulic actuation of said rams into purely vertical components. To accomplish this with a high degree of efficiency, the two cylinders 13 are inclined upwardly. The lower end portions of the cradle 10 serve as guides for the free ends of the cylinders 13 to prevent shifting movement of said cylinders longitudinally of the tractor during operation thereof.

It will, of course, be understood that various changes may be made in the form, details, arrangement and proportions of the parts without departing from the scope of my invention.

What I claim is:

1. A mounting and dumping mechanism for front end loader scoops for tractors and the like, said mechanism comprising scoop engaging and supporting structure adapted to be mounted on the scoop elevating arms in underlying relation to the scoop, a pair of elevating mechanisms mounted on said scoop engaging and supporting structure and respectively connected under the ends of the scoop, said connections being disposed rearwardly of the center of gravity of the loaded scoop when in lowered position, said scoop engaging and supporting structure having fulcrum forming means disposed when said scoop is in lowered position in forwardly spaced relation to said elevating mechanisms to form an axis on which the scoop will swing when both elevating mechanisms are simultaneously actuated to dump the scoop directly forwardly, and means for selectively actuating only one of said elevating mechanisms at a time to dump the scoop to the side of the tractor.

2. A scoop mounting and dumping mechanism for tractor front end loaders and the like comprising a scoop engaging and supporting cradle, a pair of scoop elevating mechanisms mounted on said cradle and adapted to be respectively connected at the end portions of a scoop in rearwardly spaced relation to the center of gravity of the loaded scoop when in lowered position, said cradle having forwardly disposed fulcrum forming elements engaging said scoop in forwardly spaced relation to the connection with said elevating mechanisms when the scoop is in lowered position, means associated with said elevating mechanisms for holding the scoop against lateral shifting movement when only one of said mechanisms is actuated to elevate only one of said scoop ends and dump the scoop laterally of the tractor carrying the same, and means for simultaneously actuating said elevating mechanisms as well as individually actuating the same.

3. A mounting and dumping mechanism for front end loader scoops for tractors and the like, said mechanism comprising a scoop engaging and supporting structure connected with the scoop elevating mechanism and engaging the lower rear portion of a front end loader scoop when the same is in lower position, a pair of hydraulic cylinders, each connected at one end of said supporting structure and at the other end to the respective side portions of the scoop, the ends connected with the scoop being disposed at a somewhat higher elevation than the ends connected with said supporting structure when the scoop is in lowered position, said scoop engaging and supporting structure having fulcrum forming means disposed when the scoop is in lowered position in forwardly spaced relation to the connection between the scoop and said hydraulic cylinders whereby simultaneous actuation of said cylinders will dump said scoop forwardly and individual actuation thereof will dump said scoop selectively laterally.

4. A scoop mounting and dumping mechanism for tractor front end loaders and the like comprising a scoop engaging cradle structure including scoop engaging elements and hydraulic cylinder guiding means, said guiding means comprising a pair of closely spaced substantially parallel transversely disposed guiding members, a pair of hydraulic cylinders, each having a ram mounted therein and each being pivotally connected at their outer ends to the end portions of a front end loader scoop and at their inner ends at substantially adjacent pivot points to said cradle structure between the two guiding members thereof, said outer ends of the cylinders being disposed when said scoop is in lowered position at a higher elevation than the inner ends and the connection with said scoop being disposed rearwardly of the forward fulcrum forming portions of said cradle structure when said scoop is in lowered position.

HARRY W. ADDISON, Jr.

REFERENCES CITED

The following references are of record in the file of this patent:

UNITED STATES PATENTS

| Number | Name | Date |
|---|---|---|
| 1,553,482 | Strohacker | Sept. 15, 1925 |
| 2,427,968 | Hoover | Sept. 23, 1947 |
| 2,471,192 | Boulton | May 24, 1949 |
| 2,514,622 | Boulton | July 11, 1950 |
| 2,575,552 | Glenn | Nov. 20, 1951 |
| 2,585,095 | Daniels | Feb. 12, 1952 |